United States Patent [19]
Hsu

[11] Patent Number: 6,159,292
[45] Date of Patent: Dec. 12, 2000

[54] TAPE RULER COATING NYLON RESIN FORMING STRUCTURE

[76] Inventor: Cheng-Hui Hsu, No. 126, Pad Chung Road, Hsin Tien City, Taipei Hsien, Taiwan

[21] Appl. No.: 09/186,124

[22] Filed: Nov. 4, 1998

[51] Int. Cl.[7] ....................................................... B05C 3/12
[52] U.S. Cl. ............................................. 118/405; 118/420
[58] Field of Search ................................... 427/209, 430.1, 427/435, 434.2; 118/404, 405, 419, 420

[56] References Cited

U.S. PATENT DOCUMENTS

| | | | |
|---|---|---|---|
| 1,956,466 | 4/1934 | Palm | 118/419 X |
| 3,540,918 | 11/1970 | Trattner et al. | 118/405 X |
| 5,540,775 | 7/1996 | Milliman | 118/405 |
| 5,795,392 | 8/1998 | Milliman | 118/405 |
| 5,873,941 | 2/1999 | Milliman | 118/405 X |
| 5,964,945 | 10/1999 | Milliman | 118/419 X |

*Primary Examiner*—Kevin Weldon
*Attorney, Agent, or Firm*—Pro-Techtor International Services

[57] ABSTRACT

A taper ruler coating nylon resin forming structure that includes mainly a forming structure body, a guide locator stem body, a positioning block, a forming die, and a stopper. The structure provides an improved forming structure for producing pre-printed tape ruler strips that are coated with a layer of nylon resin. The coating give the strips improved suppleness and increased wear resistance against frictional abrasion.

1 Claim, 9 Drawing Sheets

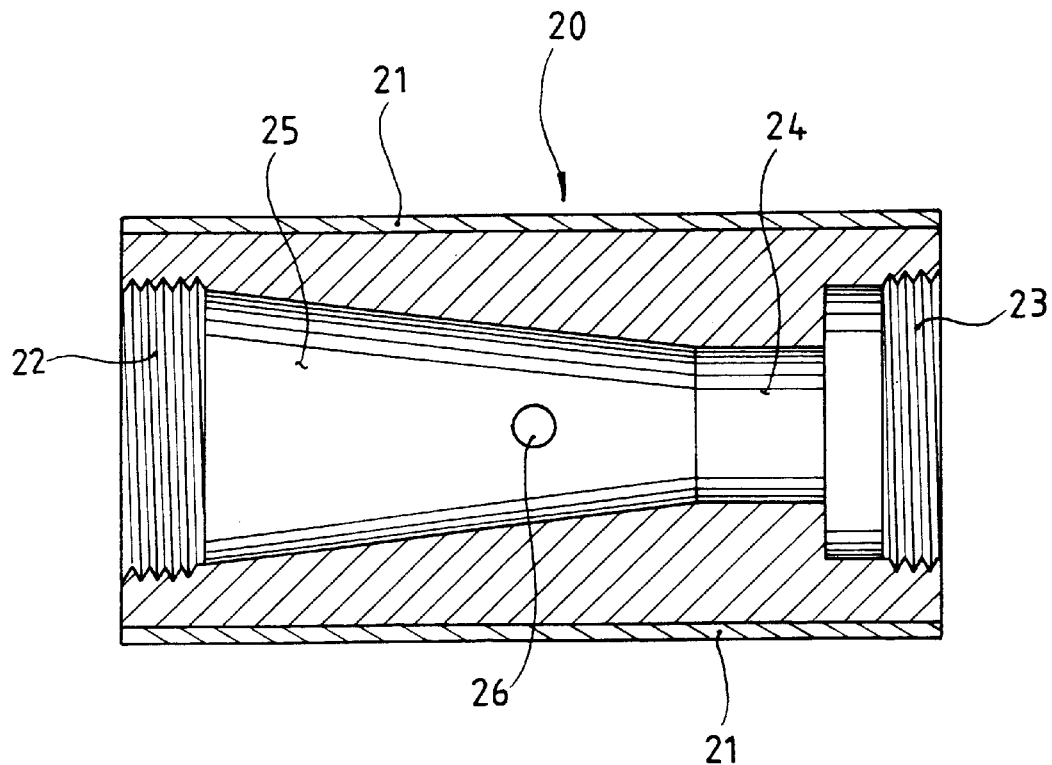
F I G . 5
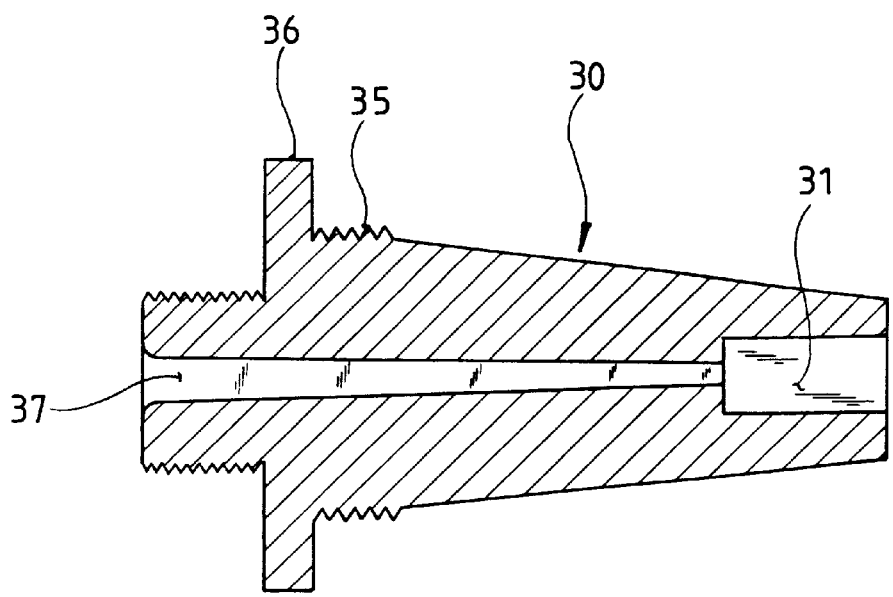
F I G . 7

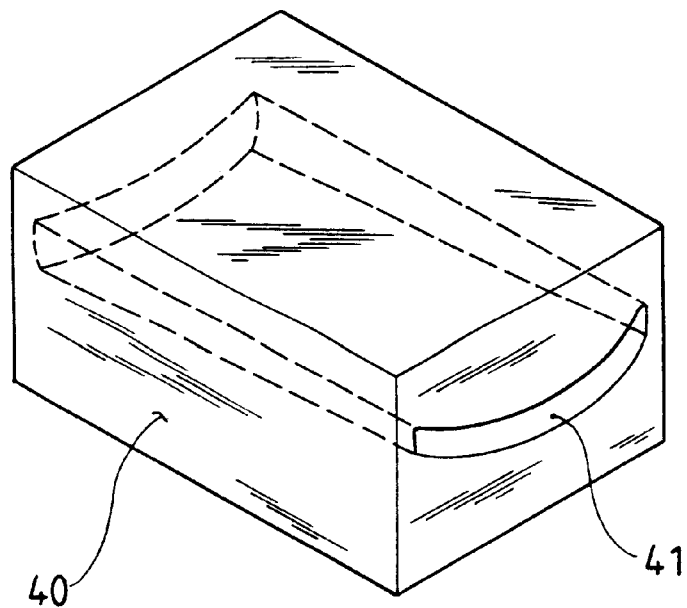
F I G . 8
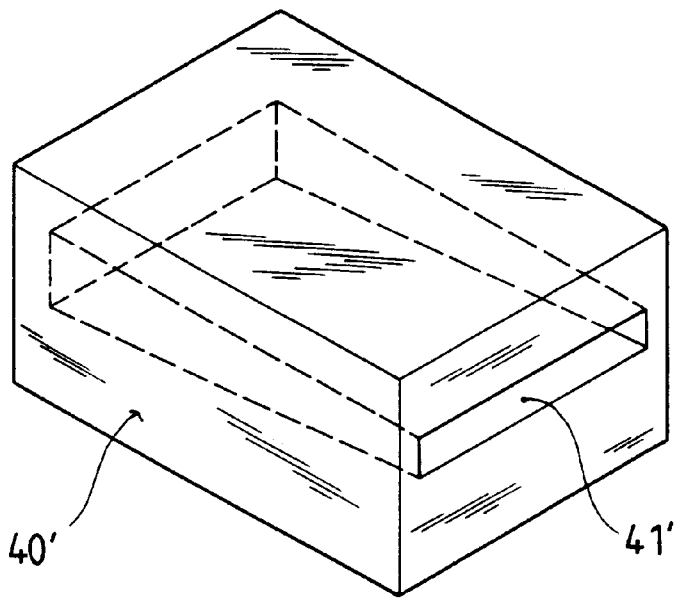
F I G . 9

TAPE RULER COATING NYLON RESIN FORMING STRUCTURE

SCOPE OF THE INVENTION

The invention herein relates to a kind of tape ruler coating nylon resin forming structure, specifically referring a kind of improved forming structure for producing pre-printed tape ruler strips that are coated with a layer of nylon resin and, therefore, the fabrication of a tape ruler strip having a higher degree of suppleness and, furthermore, increased wear resistance against frictional abrasion.

BACKGROUND OF THE INVENTION

Conventional steel tape rulers are typically constructed of a steel material that is cut to a required width to form steel strips that can be wound circularly. The aforesaid steel strips are first subjected to a phosphate surface treatment and then the upper and lower surfaces are painted with baked enamel. After baking, the units of measurement are printed on the enamel and to complete the tape ruler, a single layer of a transparent finish coat (typically an acrylic epoxy modifier) is applied and the product is baked again. Since the units of measurement on the aforesaid steel tape ruler strips are imprinted utilizing conventional baked enamel technology followed by the application of only one layer of finish coating, the measurement units are easily worn off during utilization to the point of being unclear. However, in an effort to prolong the clarity of the measurement units on steel tape ruler strips during long-term usage, the inventor of the invention herein, having many years of specialized manufacturing experience, addressed the existent technological production shortcomings of the aforesaid steel tape ruler by conducting extensible research and development and, furthermore, to ensure maximum functionality, the invention herein was subjected to numerous tests and improvements until culmination as the tape ruler coating nylon resin forming structure of the invention herein.

SUMMARY OF THE INVENTION

Therefore, the primary objective of the invention herein is to provide a kind of tape ruler coating nylon resin forming structure that allows for the fabrication of a new innovative product, wherein the units of measurement printed on the steel tape ruler strip are coated with nylon resin by the invention herein for additional durability against frictional abrasion, enhanced wear resistance and, furthermore, protection from hand injuries during usage.

DESCRIPTION OF THE DRAWINGS

FIG. 5 is a cross-sectional drawing of the body of the invention herein.

FIG. 7 is a cross-sectional drawing of the guide body of the invention herein.

FIG. 8 is an isometric drawing of the positioning block of the invention herein.

FIG. 9 is an isometric drawing of another positioning block of the invention herein.

DETAILED DESCRIPTION OF THE INVENTION

Figure 1:
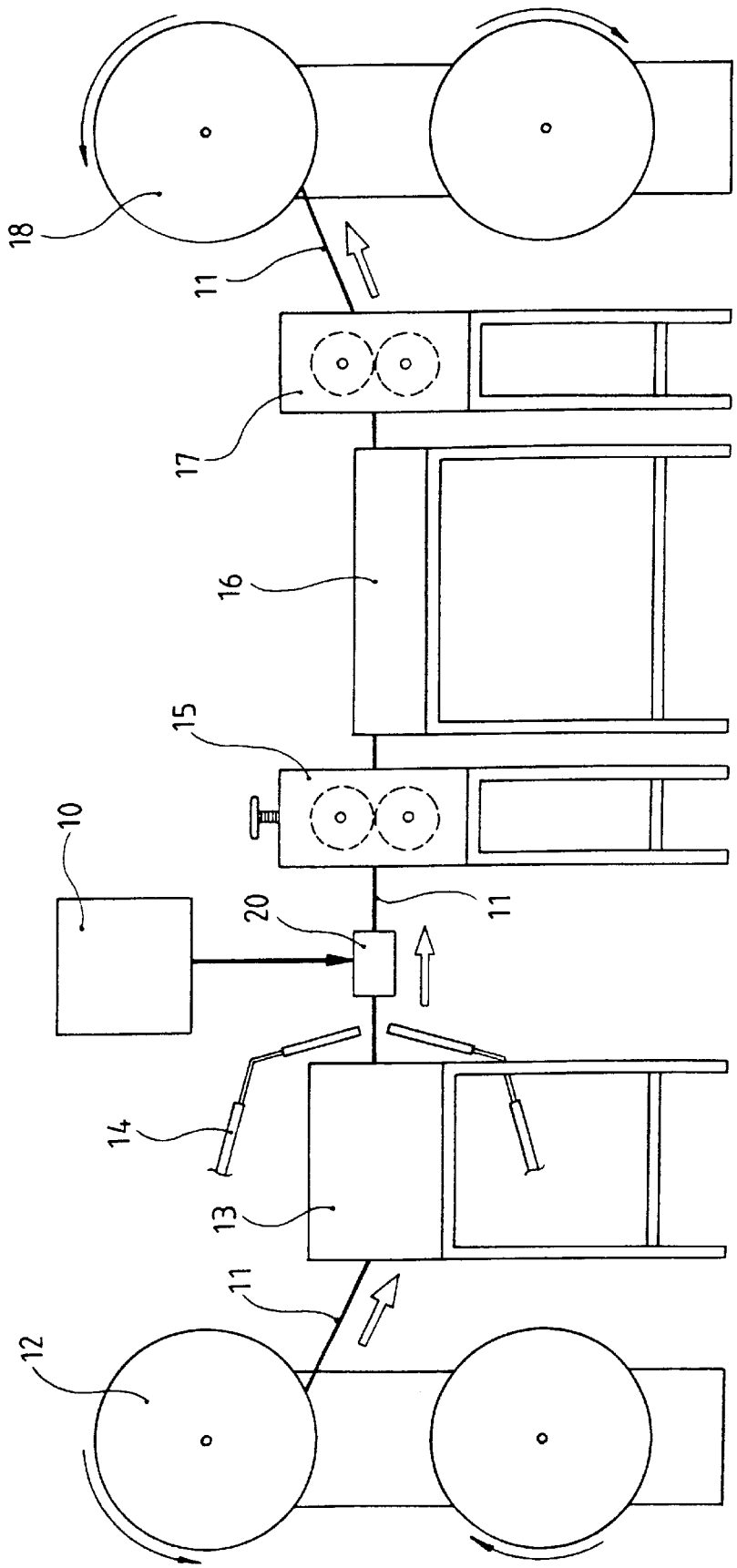
FIG. 1 is an orthographic drawing of the invention herein as placed within the context of the conventional process.

Referring to FIG. 1, the tape ruler nylon resin coating process of the invention herein consists of the tape ruler strip with the units of measurement already printed (referring to the printing of the measurement increments on the aforementioned tape ruler completed by the conventional production process prior to acrylic epoxy modifier dip dyeing) and wound around the input reel (12) from which the tape ruler strip (11) enters the preheating box (13) for preheating and then the heaters (14) heat the tape ruler strip (11) to the nylon resin coating temperature; the tape ruler strip (11) is next guided into forming structure body (20) of the invention herein, where the pressure output unit (10) injects nylon resin into the forming structure body (20) to coat the tape ruler strip (11) which is afterwards imprinted by the embossing printer (15) and then undergoes cold forming inside the water coolant tank (16), and finally the turning machine (17) winds the tape ruler strip (11) around the retrieval reel (18) to complete the tape rule strip. [The input reel (12), preheating box (13), heaters (14), embossing printer (15), water coolant tank (16), turning machine (17), and the retrieval reel (18) are not among the innovations of the invention here and shall not be further elaborated.]

Figure 2:
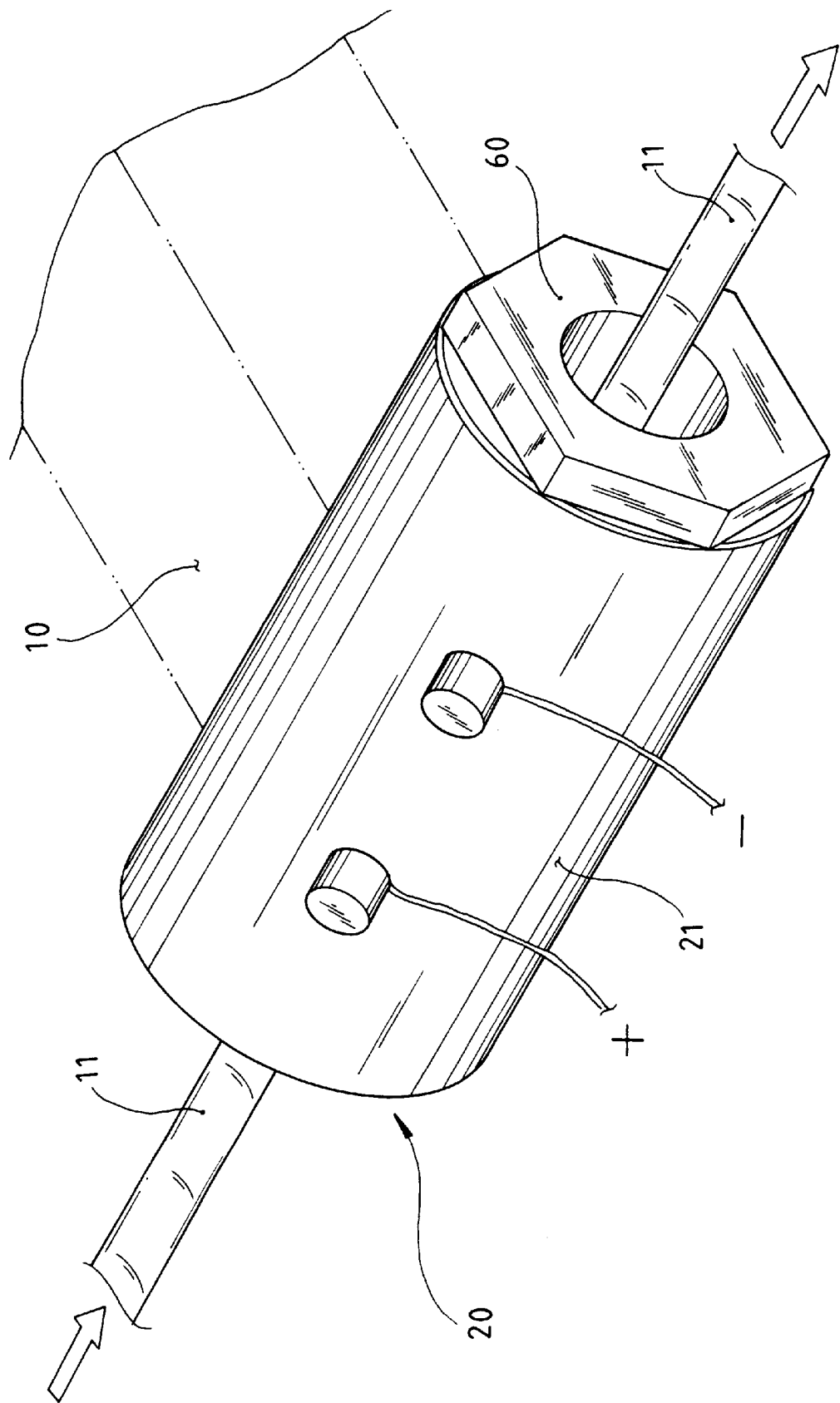
FIG. 2 is an assembly drawing of the invention herein.

Referring to FIG. 2, the forming structure body (20) of the tape ruler coating nylon resin forming structure of the invention herein is connected to a conventional pressure output unit (10) and as the tape ruler strip (11) is admitted into one end of the forming structure body (20), the pressure output unit (10) injects nylon resin into the forming structure body (20) and one layer of nylon resin is applied to the tape ruler strip (11), and the tape ruler strip (11) then emerges from the other end of the forming structure body (20) [in the direction indicated by the arrowhead]; furthermore, the forming structure body (20) is externally ensheathed in an electrothermal element (21) that is connected to a power supply and maintains the invention herein at a suitable coating temperature of approximately 200° C. to 300° C.

Figure 3:
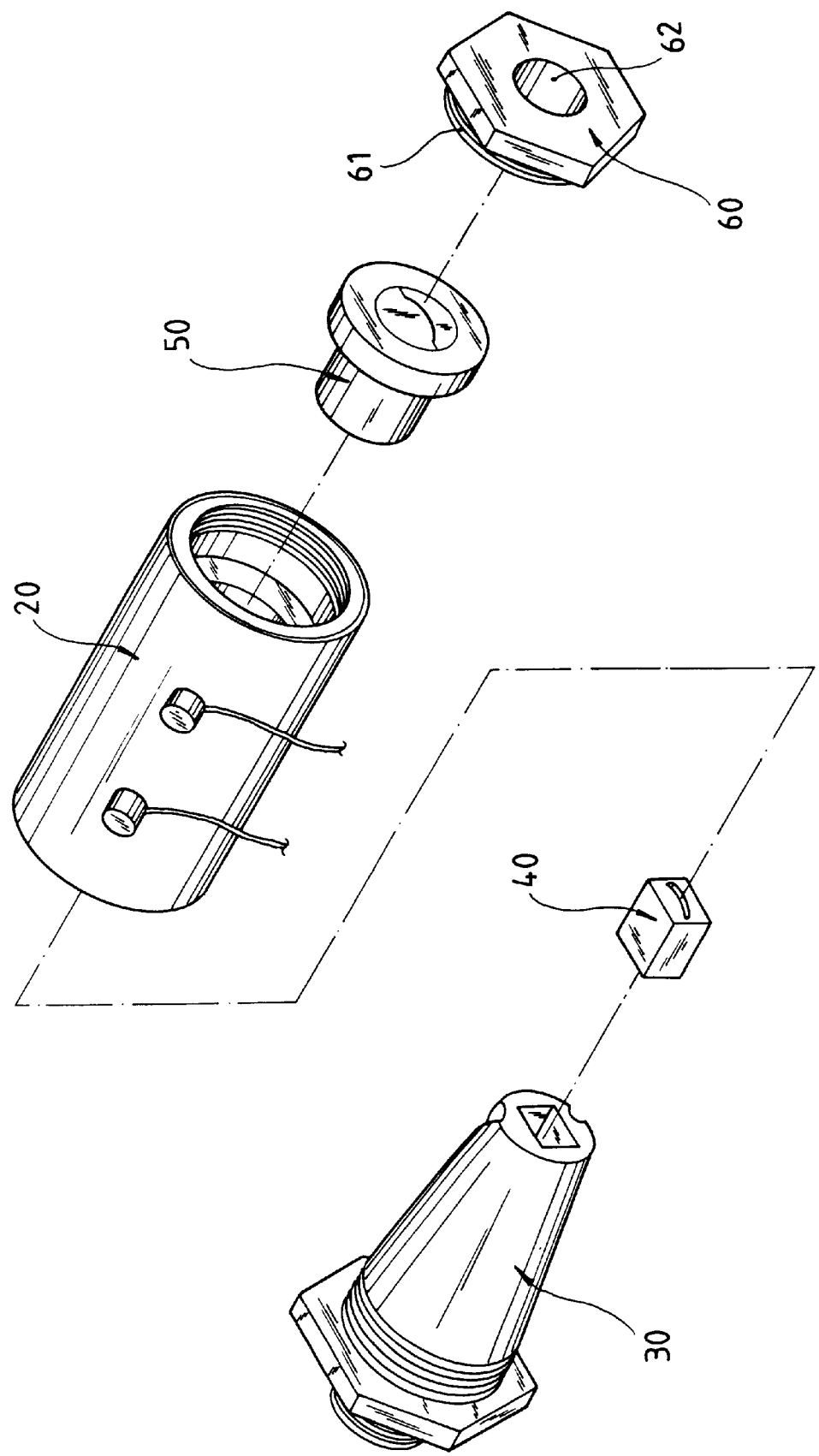
FIG. 3 is an exploded drawing of the invention herein.
Figure 4:
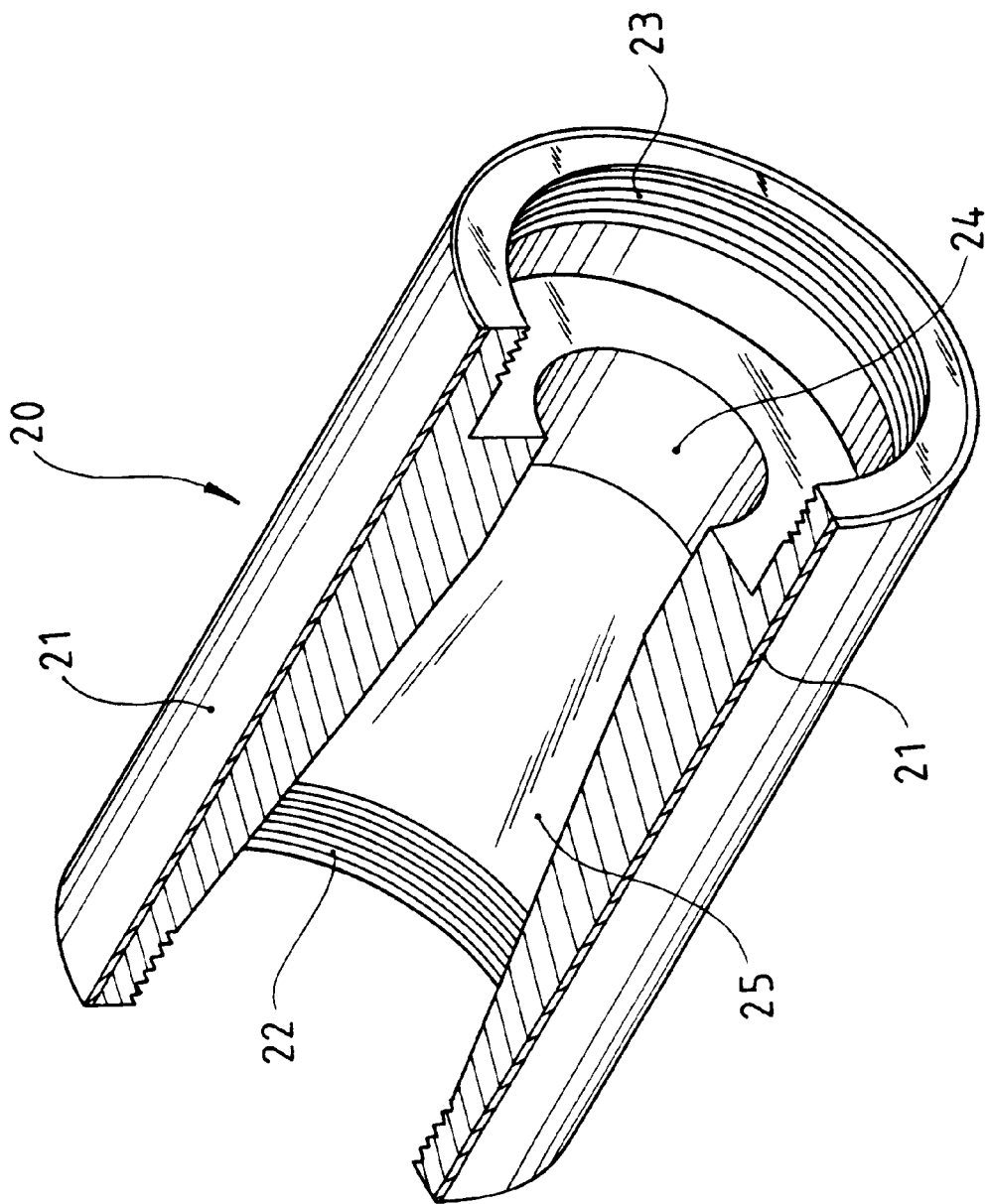
FIG. 4 is partial isometric cross-sectional drawing of the body of the invention herein.

The tape ruler coating nylon resin forming structure of the invention herein is mainly comprised of the forming structure body (20), a guide locator stem body (30), a positioning block (40), a forming die (50), and a stopper (60) [as indicated in FIG. 3], of which:

The forming structure body (20), as indicated in FIG. 4 and FIG. 5, is cylindrical in shape and ensheathed in an electrothermal element (21), and there are internal threads (22) and (23) at the front and rear, respectively, of the aforesaid forming structure body (20), with a stepped passageway (24) near one end of the internal threads (23) and a conical passageway (25) in between the internal threads (22) and the stepped passageway (24) towards the other end and, furthermore, there is a material feed orifice (26) through one side of the conical passageway (25) that is connected to the pressure output unit (10).

Figure 6:
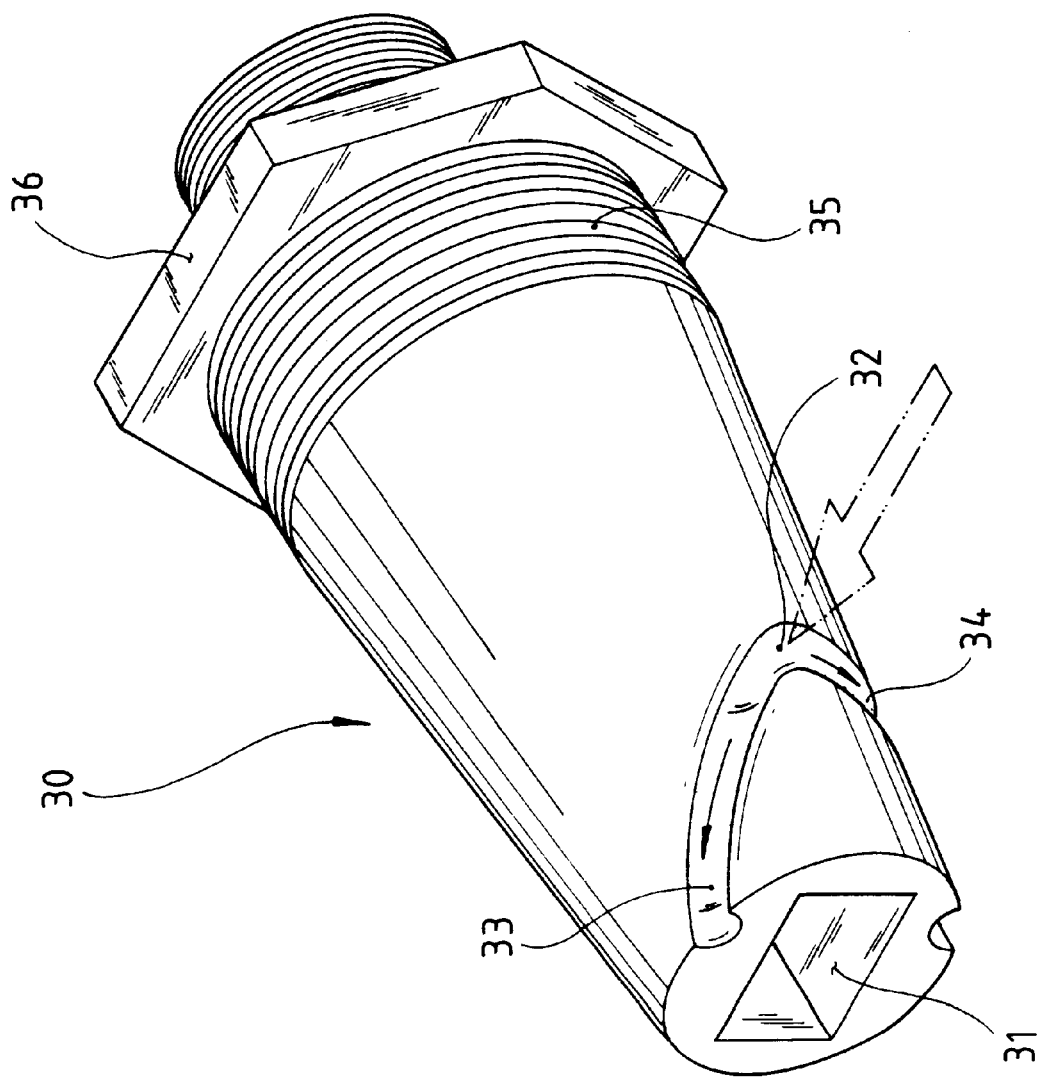
FIG. 6 is an isometric drawing of the guide body of the invention herein.
Figure 10:
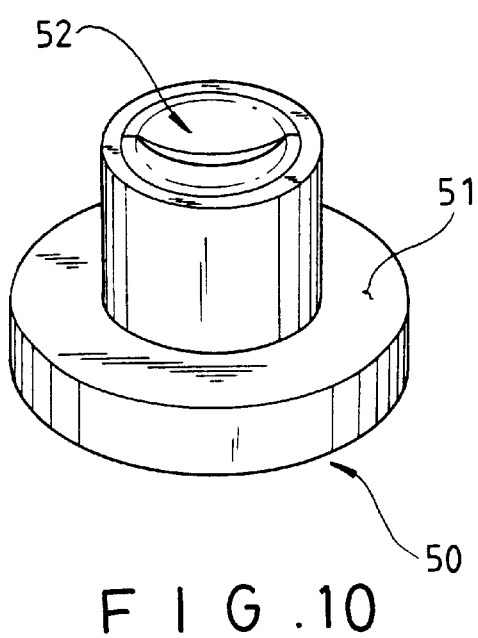
FIG. 10 is an isometric drawing of the forming die of the invention herein.
Figure 11:
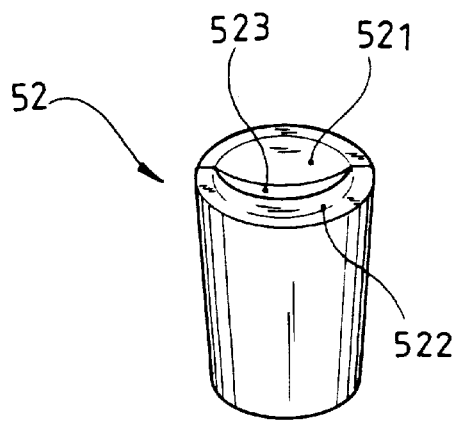
FIG. 11 is an isometric drawing of the forming gage block of the invention herein.
Figure 14:
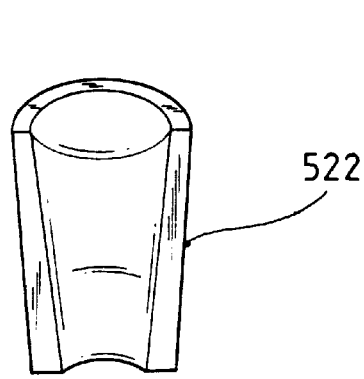
FIG. 14 is an isometric drawing of the lower gauge block of the invention herein.
Figure 12:
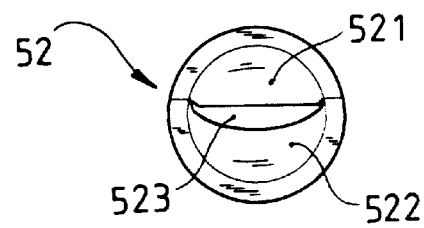
FIG. 12 is an orthographic drawing of the forming gage block of the invention herein as viewed from an anterior perspective.
Figure 15:
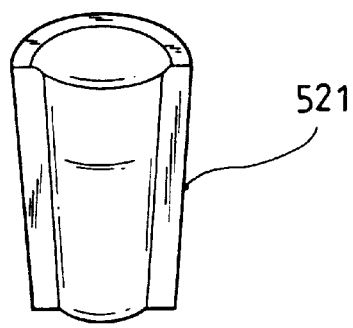
FIG. 15 is an isometric drawing of the upper gauge block of the invention herein.
Figure 13:
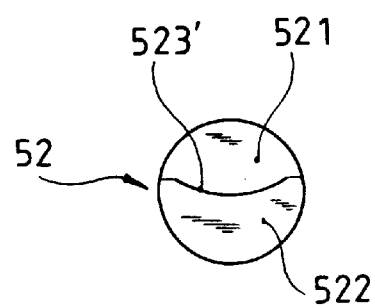
FIG. 13 is an orthographic drawing of the forming gage block of the invention herein as viewed from an posterior perspective.
Figure 16:
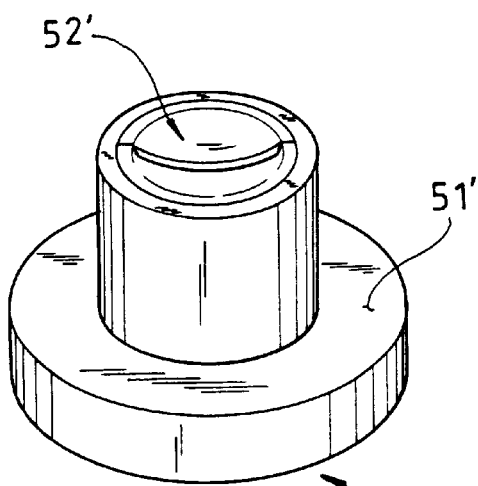
FIG. 16 is an isometric drawing of another forming die of the invention herein.
Figure 17:
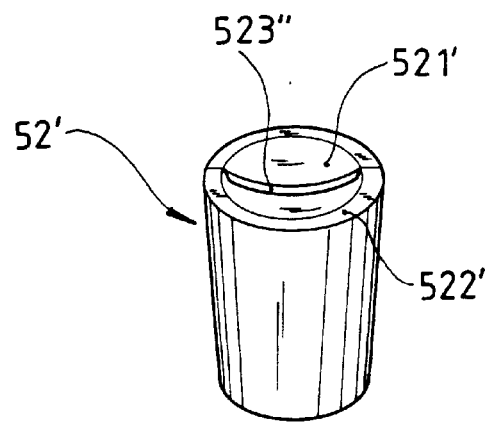
FIG. 17 is an isometric drawing of another forming gage block of the invention herein.
Figure 20:
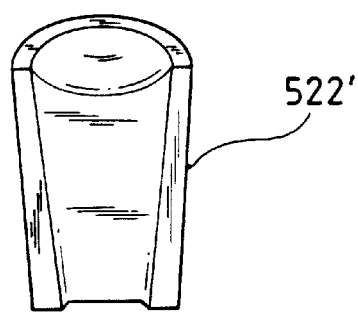
FIG. 20 is an isometric drawing of the other lower forming gage block of the invention herein shown in FIG. 17.
Figure 18:
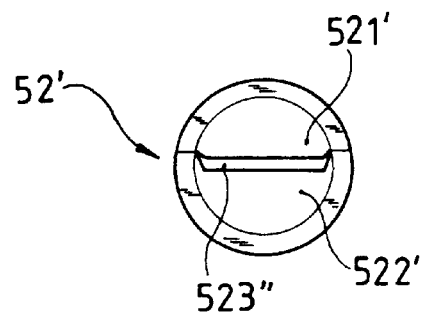
FIG. 18 is an isometric drawing of the other forming gage block of the invention herein as viewed from an anterior perspective.
Figure 21:
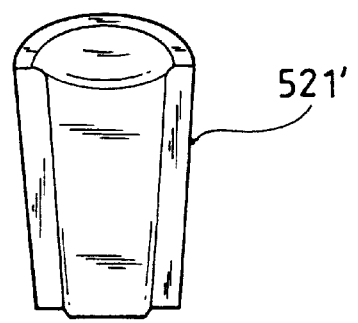
FIG. 21 is an isometric drawing of the other upper forming gage block of the invention herein shown in FIG. 17.
Figure 19:
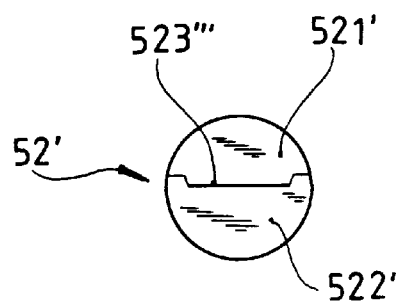
FIG. 19 is an isometric drawing of the other forming gage block of the invention herein as viewed from an posterior perspective.

The guide locator stem body (30), as indicated in FIG. 6 and FIG. 7, is a conical stem that has external threads (35) and a nut (36) at one end, as well as a guide locator passage (37) originating near the extremity of the nut (36) on the guide locator stem body (30) and a rectangular passage (31) that originates at the other end; the aforesaid guide locator passage (37) has a circumference that graduates from a larger to a smaller diameter and is contiguous with the rectangular passage (31), and along the outer side of the rectangular passage (31) on the guide locator stem body (30) is a material compression groove (32) and the two material flow paths (33) and (34).

The positioning block (40), as indicated in FIG. 8, is a rectangular block having an arc-shaped positioning channel (41) that extends completely through with a gradually diminishing height: furthermore, as indicated in FIG. 9, the interior of the positioning block (40) of the invention herein can also accommodate a planar profile when required for coating the tape rule strip (11) by modifying the positioning channel (41') that extends completely through with a gradually diminishing height to a flat profile.

The forming die (50), as indicated in FIG. 10, FIG. 11, FIG. 12, FIG. 13, FIG. 14 and FIG. 15, consists of a conical forming gage block (52) that is inserted into a stepped stem-like die sleeve (51) and, furthermore, the aforesaid forming gage block (52) is composed of an upper gage block (521) and a lower gage block (522), with forming recesses along the contact seam of the surfaces, and there is a front forming channel (523) at one end of the aforesaid recess seam and a rear forming channel (523') at the other end; furthermore, as indicated in FIG. 16, FIG. 17, FIG. 18, FIG. 19, FIG. 20 and FIG. 21, the forming die (50') of the invention herein can also accommodate a planar profile when required for coating the tape rule strip (11) by modifying the front forming channel (523") and the rear forming channel (523''') in between the upper gage block (521') and a lower gage block (522') to a flat profile.

The stopper (60), as indicated in FIG. 3, has external threads (61) at one end and a though-hole (62) at the center.

The aforementioned positioning block (40) in inserted into the rectangular passage (31) of the guide locator stem body (30), following which the guide locator stem body (30) is fastened into the internal threads (22) of the forming structure body (20) such that the material compression groove (32) of the guide locator stem body (30) is aligned with the materials feed orifice (26) in the forming structure body (20); the forming die (50) is inserted into the stepped passageway (24) at the opposite end of the forming structure body (20) such that front forming channel (523) inside the forming die (50) is aligned with the arc-shaped positioning channel (41) of the positioning block (40); and then the stopper (60) is fastened against the forming die (50) inside the forming structure body (20), which constitutes the overall tape ruler coating nylon resin forming structure of the invention herein.

APPLICATION OF THE INVENTION

In the invention herein, the pre-printed tape ruler strip (11) is fed into the guide locator passage (37) of the guide locator stem body (30) and then inserted through the arc-shaped positioning channel (41) of the positioning block (40), and when the tape ruler strip (11) enters the forming gage block (52) of the forming die (50), a curved space is produced in the front forming channel (523) of the forming gage block (52), which leaves room for the nylon resin to accumulate within the positioning block (40), such that the nylon resin is injected into the material feed orifice (26) of the forming structure body (20) by the pressure output unit (10), then directed along the material compression groove (32) of the guide locator stem body (30), and travels along the material flow paths (33) and (34) to the front forming channel (523) of the forming gage block (52), thereby enabling both the tipper and lower surfaces of the tape ruler strip (10) to become coated with the nylon resin, and after the tape ruler strip (10) proceeds through the rear forming channel (523') [approximately 0.5 mm] of the forming gage block (52), the tape ruler strip (10) emerges coated with a layer of nylon resin, which allows for a new innovative product in which the units of measurement printed on the tape ruler strip (10) have additional durability against frictional abrasion, enhanced wear resistance and, furthermore, protects the hand from injuries.

In summation of the foregoing description, the tape ruler coating nylon resin forming structure of the invention is definitely capable of achieving the functions and objectives of the invention herein [refer to the attached samples] and, furthermore, provides practical production value in compliance with new patent requirements; therefore, the invention herein is submitted for review pursuant to the granting of the commensurate patent rights.

What is claimed is:

1. A tape ruler coating nylon resin forming structure comprising:

a forming structure body, a guide locator stem body, a positioning block, a forming die, and a stopper; wherein said forming structure body is enclosed in an electrothermal heating element, and said forming structure body includes threads at a first end and threads at a second end, said first end of said forming structure body includes a stepped cavity, said second end of said forming structure body includes a conical cavity, said forming structure body further includes a material feed orifice therein, said guide locator stem body is a conical body with external threads and a nut at a first end so that said guide locator stem body is threaded into said second end of said forming structure body and received in said conical cavity thereof, said guide locator stem body further comprises a longitudinal guide locator passage in an interior of said guide locator stem body, said guide locator passage tapers downward from a first sectional area at said first end of said guide locator passage to a second sectional area at said second end of said guide locator passage, said positioning block is situated in said second end of said guide locator passage, said positioning block includes an arced positioning channel that also tapers downward from a first sectional area at a first end to a second sectional area at a second end, said arced positioning channel is aligned with said guide locator passage, said forming die comprises a forming gage block that is inserted into a die sleeve, said die sleeve is secured in said conical cavity of said second end of said forming structure body by said stopper, said forming gage block comprises a forming channel therein, said forming channel has a profile matching that of a desired profile of a tape ruler being processed, and said stopper includes a through hole aligned with said forming channel, said forming channel and said through hole being aligned with said arced positioning channel of said positioning block; such that said tape ruler is inserted into said larger sectional area of said first end of said guide locator passage of said forming structure body and passes through said forming structure body and exits from said second sectional area at said second end of said positioning block, said tape ruler then enters and passes through said forming channel of said forming die so that said tape ruler is coated with a nylon resin fed through said material feed orifice while said tape ruler is formed in said forming structure.

\* \* \* \* \*